United States Patent [19]
Yeh

[11] Patent Number: 5,889,513
[45] Date of Patent: Mar. 30, 1999

[54] DISPLAY DEVICE FOR DETECTING WORKING LOAD OF A CPU

[75] Inventor: Henry Yeh, Chung-Li, Taiwan

[73] Assignee: Twinhead International Corp., Taiwan

[21] Appl. No.: 955,230

[22] Filed: Oct. 21, 1997

[51] Int. Cl.⁶ .................................................. G09G 5/00
[52] U.S. Cl. ................. 345/211; 395/750.08; 315/169.3
[58] Field of Search ................................. 345/211, 212; 395/750.08; 315/155, 169.3

[56] References Cited

U.S. PATENT DOCUMENTS

| | | | |
|---|---|---|---|
| 4,237,482 | 12/1980 | Brentlinger | 348/743 |
| 4,398,133 | 8/1983 | Beaumont et al. | 315/411 |
| 5,093,654 | 3/1992 | Swift et al. | 345/76 |
| 5,402,042 | 3/1995 | Madsen | 315/174 |
| 5,498,910 | 3/1996 | Kuwata et al. | 345/212 |

Primary Examiner—Amare Mengistu
Assistant Examiner—Ricardo Osorio
Attorney, Agent, or Firm—Proskauer Rose LLP

[57] ABSTRACT

Disclosed is a display device for detecting working load of a CPU which includes a resistor having a low resistance connected in series between a power supply and the CPU. The voltage drop across the resistor is amplified by a differential amplifier. The amplified voltage is converted into digital signal by means of an A/D converter. A plurality of LEDs are driven by the digital signal to responsively show the working load state of the CPU.

5 Claims, 3 Drawing Sheets

DISPLAY DEVICE FOR DETECTING WORKING LOAD OF A CPU

FIELD OF THE INVENTION

This invention relates to a display device for detecting the working load of a CPU, particularly to a display device which detects the electricity consumption of the CPU and responsively shows the working load of CPU immediately.

BACKGROUND OF THE INVENTION

For desktop and notebook computers, it becomes more and more important to manage power source. The more working load of a CPU has, the more electricity consumption it takes, i.e. the working load of the CPU is proportional to the electricity consumption. Therefore, the so-called environmental protection computer was developed and are available in the market. In the operation of the environmental protection computer, if for a period of time a user does not input a command, the computer enters an idle state automatically in order to save electrical power. No matter whether the environmental protection computer is in idle state or in operation state, the user cannot know the present working load of the CPU from the outside of the computer, thus, the optimum state of the CPU cannot be monitored and controlled.

SUMMARY OF THE INVENTION

The inventor of the present invention utilizes the principle that the working load of a computer CPU is proportional to the consumed current and to the electrical power it consumes to obtain the working load bymonitoring the consumed electricity of the CPU. The working load is shown by a display device on the computer housing in order to allow the user to know and control the working situation of the CPU.

It is an object of the present invention to provide a display device for detecting the working load of the CPU on a mother board in which device a resistor having a low resistance is connected in series between a power supply and a CPU. The voltage drop across the resistor is amplified by a differential amplifier. The amplified voltage is converted into digital signal by using an A/D converter. A plurality of LEDs are driven by the digital signal to responsively show the working load of the CPU.

DETAILED DESCRIPTIONS OF THE INVENTION

Figure 1:
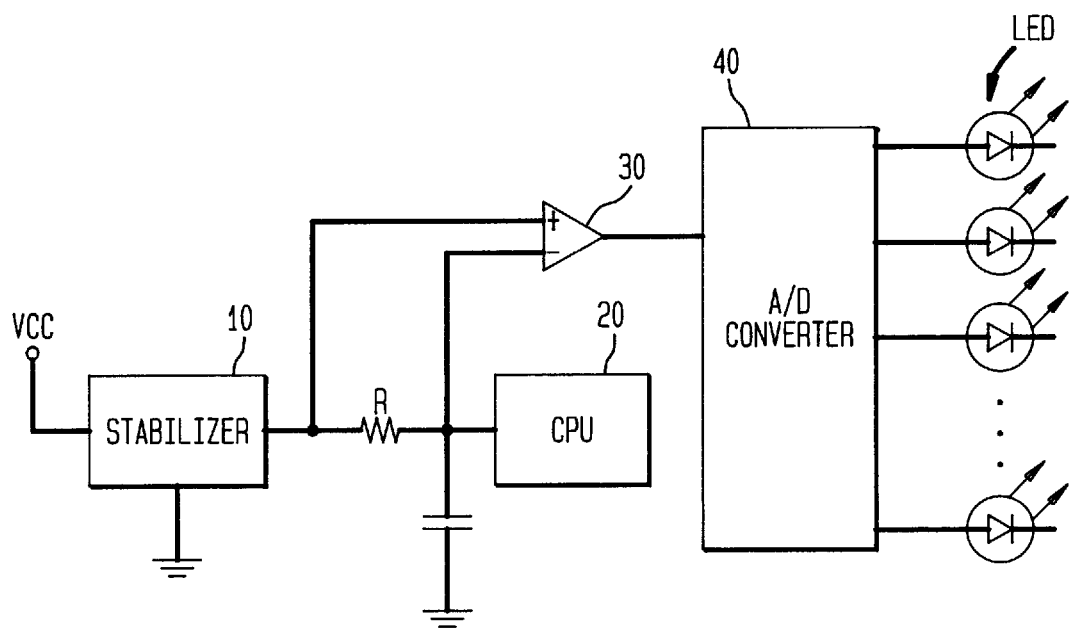
FIG. 1 is a first embodiment of the circuit diagram of this invention.
Figure 2:
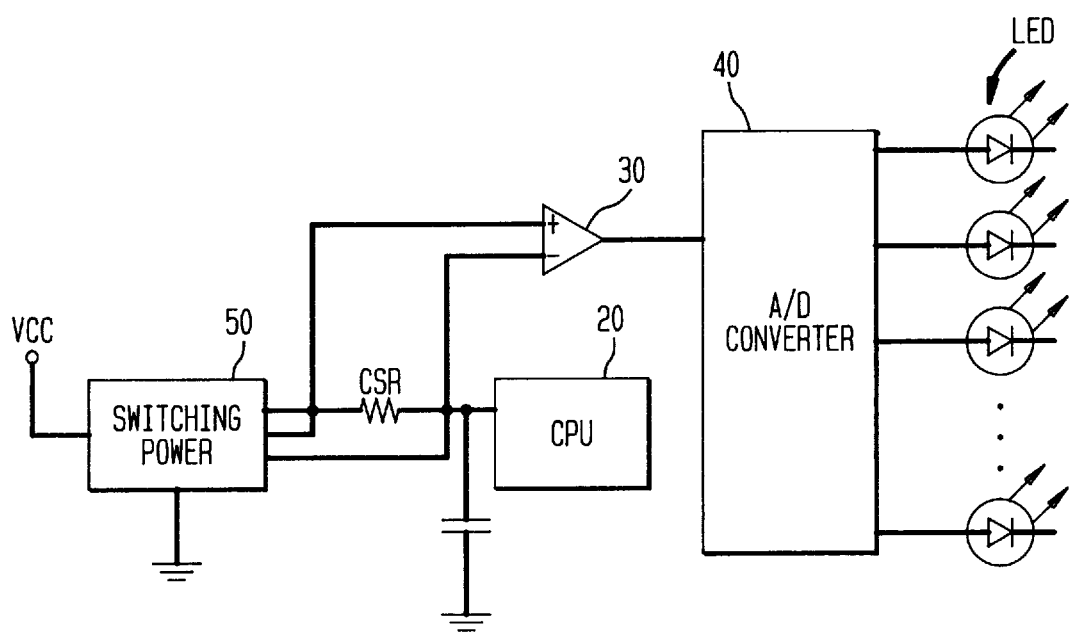
FIG. 2 is a second embodiment of the circuit diagram of this invention.
Figure 3:
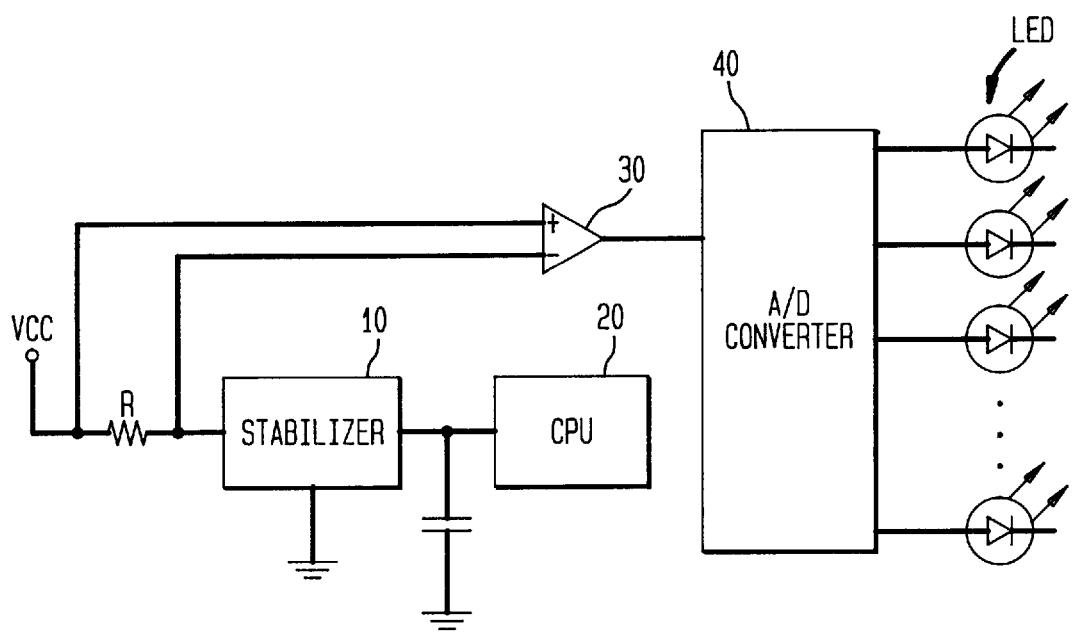
FIG. 3 is a third embodiment of the circuit diagram of this invention

This invention will be explained with reference to the following three embodiments.
First Embodiment As shown in FIG. 1, the power source of a computer is provided by a power supply which is linearly stabilized. A resistor R having a small resistance is connected in series between an output of a stabilizer 10 and a CPU 20 of the computer. The two terminals of the resistor R are coupled to the positive input and negative input of a differential amplifier 30 respectively in order to detect the voltage drop across the resistor R generated by the working current flowing through the CPU 20 and to measure the working load of CPU 20. The minute variation of voltage drop across the resistor R is amplified by a differential amplifier 30. The amplified voltage is converted into a digital signal by an A/D converter 40. The digital signal drives several LEDs to emit light. Thus, the user can easily judge and measure the amount of working load of the CPU 20 by viewing and counting the number of lightening LEDs.
Second Embodiment As shown in FIG. 2, the power supply is a switching power 50. The positive input and negative input of the differential amplifier 30 are respectively connected to the two terminals of CSR( Current Sense Resistor) of the switching power 50.
Third Embodiment As shown in FIG. 3, the power supply can be switching power supply or power supply having linear stabilizer. The two terminals of a resistor R having a minute resistance can be connected in series to the positive input and negative input of the differential amplifier 30. The voltage drop across the resistor R is amplified. The amplified voltage is converted into a digital signal by an A/D converter 40 which digital signal drives several LEDs to emit light for display of the working load of the CPU 20. In this example, the variation of current flowing into the input of voltage stabilizer 10 is detected, therefore, the stability of output voltage of stabilizer 10 is not affected.

The display device for detecting the working load of the CPU of a computer of this invention can show the working load of the CPU, and responsively displays the working load by means of the LEDs. After the user views the number of lightening LEDs, he can know the working load of the CPU.

While the invention has been particularly shown and described with reference to these preferred embodiments, it will be understood by those skilled in the art that various changes in form and details may be made without departing from the spirit and scope of the invention. Although only the preferred embodiments of this invention were shown and described in the above description, it is requested that any modification or combination that comes within the spirit of this invention be protected.

We claim:

1. A display device for detecting working load of a CPU which is powered by a power supply having a linear stabilizer, the device comprising:

a resistor which is connected in series between the CPU and an output of the stabilizer;

a differential amplifier which is connected to two terminals of the resistor for amplifying a voltage drop across the resistor;

an A/D converter which converts the output voltage of the differential amplifier into a digital signal; and a plurality of LEDs which are driven by the digital signal from the output of the A/D converter in order to show the CPU working load.

2. The display device for detecting working load of a CPU as claimed in claim 1 wherein the resistor has a minute resistance.

3. A display device for detecting working load of a CPU which is powered by a switching power supply, the device comprising:

a current sense resistor;

a differential amplifier which is connected to the two terminals of the current sense resistor of the switching power supply in order to amplify the voltage drop across the resistor;

an A/D converter which converts the output voltage of the differential amplifier into a digital signal;

a plurality of LEDs which are driven by the digital signal from the A/D converter in order to show the CPU working load.

4. The display device for detecting working load of a CPU as claimed in claim 3 wherein the resistor is placed between power supply and the input of a stabilizer.

5. The display device for detecting working load of a CPU as claimed in claim 4 wherein the stabilizer is substituded by a switching power supply.

* * * * *